(12) United States Patent
Thomas (10) Patent No.: US 10,088,917 B2
(45) Date of Patent: Oct. 2, 2018

(54) DETECTOR FOR A DISPLAY (71) Applicant: Hewlett-Packard Development Company, L.P., Houston, TX (US)

(72) Inventor: Fred Thomas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/500,267

(22) PCT Filed: Jul. 30, 2014

(86) PCT No.: PCT/US2014/048888
§ 371 (c)(1),
(2) Date: Jan. 30, 2017

(87) PCT Pub. No.: WO2016/018305
PCT Pub. Date: Feb. 4, 2016

(65) Prior Publication Data
US 2017/0212611 A1    Jul. 27, 2017

(51) Int. Cl.
*G06F 5/00* (2006.01)
*G06F 3/0354* (2013.01)
*G06F 3/038* (2013.01)
*G01J 1/04* (2006.01)
*G01J 1/08* (2006.01)

(52) U.S. Cl.
CPC ........ *G06F 3/03542* (2013.01); *G01J 1/0429* (2013.01); *G01J 1/0474* (2013.01); *G01J 1/0488* (2013.01); *G01J 1/08* (2013.01); *G06F 3/0386* (2013.01)

(58) Field of Classification Search
CPC .. G06F 3/03542; G06F 3/0386; G01J 1/0429; G01J 1/0474; G01J 1/08; G01J 1/0488
See application file for complete search history.

(56) References Cited

U.S. PATENT DOCUMENTS

| 7,015,901 | B2 | 3/2006 | Lapstun et al. |
| 7,663,608 | B2 | 2/2010 | Sui et al. |
| 8,692,212 | B1 | 4/2014 | Craft et al. |
| 2005/0162400 | A1 | 7/2005 | Tseng et al. |

(Continued)

FOREIGN PATENT DOCUMENTS

| CN | 1632824 | 6/2005 |
| CN | 102736748 | 10/2012 |

(Continued)

OTHER PUBLICATIONS

Ihab Al Kabary et al., "TOUCHify: Bringing Pen-Based Touch Screen Functionality to Flat Panel Display Screens," IEEE, Jun. 23, 2013, pp. 111-116.

*Primary Examiner* — Jonathan Boyd
(74) *Attorney, Agent, or Firm* — HP Inc. Patent Department (57) ABSTRACT

An apparatus includes a light source to transmit non-visible light pulses strobed at a frequency and a duty cycle. A detector a detector receives a pattern of reflected light from a display in response to the non-visible light pulses. The pattern of reflected light had at least two different polarization states, where the detector determines a spatial location of the detector relative to the display based on discriminating between the at least two polarization states.

12 Claims, 7 Drawing Sheets

(56) References Cited

U.S. PATENT DOCUMENTS

| | | |
|---|---|---|
| 2006/0001654 A1 | 1/2006 | Smits |
| 2008/0111797 A1 | 5/2008 | Lee |
| 2012/0229384 A1 | 9/2012 | Nakane et al. |
| 2012/0249475 A1 | 10/2012 | Murphy et al. |
| 2012/0249490 A1* | 10/2012 | Lee .................. G06F 3/03542 345/179 |

FOREIGN PATENT DOCUMENTS

| | | |
|---|---|---|
| CN | 103123427 | 5/2013 |
| EP | 2506125 | 10/2012 |
| KR | 10-20080044017 | 5/2008 |
| KR | 101252243 | 4/2013 |
| TW | I276986 | 3/2007 |
| TW | 201319897 | 5/2013 |
| WO | WO-2006004983 | 1/2006 |
| WO | WO-2010015881 | 2/2010 |
| WO | WO-2013039514 | 3/2013 |

* cited by examiner

DETECTOR FOR A DISPLAY

CROSS-REFERENCE TO RELATED APPLICATION

This application is a U.S. National Stage Application of and claims priority to International Patent Application No. PCT/US2014/048888, filed on Jul. 30, 2014, and entitled "DETECTOR FOR A DISPLAY," which is hereby incorporated by reference in its entirety.

BACKGROUND

Modern industrial design continues to increase reliance on combined input output devices. Devices such as capacitive or resistive touch screens provide an elegant, simple, and industrially "clean" design for providing both input (touch) and output (display) capabilities. A touchscreen can be formed by placing a transparent overlay proximate the display surface. Such overlays can detect the presence and location of input (i.e., a "touch") based upon a change in electrical properties of the overlay. While the level of touch accuracy and resolution using such devices is sufficient for many consumer electronics, the accuracy and resolution are frequently insufficient for use in professional applications requiring a high degree of touch accuracy and resolution. Providing a high resolution touch and/or positional based input device acceptable to professional or commercial users presents a challenge.

DETAILED DESCRIPTION

This disclosure relates to a detector apparatus and related systems and methods. The detector apparatus can be provided as part of a digital pen, for example. The apparatus can include a light source to transmit non-visible light pulses strobed at a frequency and a duty cycle. A detector can receive a pattern of reflected non-visible light from a display in response to the non-visible light pulses. The pattern of non-visible reflected light includes at least two different polarization states associated with a position encoded contrast layer of the display. The position encoded contrast layer can include position encoded optical elements that have a different polarization state from a background area residing between elements in which they reside. The position encoded optical elements and the background area in the contrast layer thus can impose different polarization on reflected light thereby providing a corresponding pattern of reflected light that is received by the detector. The detector determines a spatial location of the detector relative to the display based on discriminating between the different polarization states in the pattern of reflected light due to polarization caused by the position encoded optical elements and the background area.

By way of example, the light source can be strobed at a rate similar to the rate at which an electronic imager captures digital information (e.g., imager in the digital pen), such as can be at a rate from about 70 hertz (Hz) to about 120 Hz, for example. The frame duration or period of the imager can be about 100 Hz. The light source strobe duration can be on the order of a single to hundreds of microseconds during the respective imager frame period, for example. This has the effect of freezing the image of position encoded optical elements and background area corresponding to the received pattern of light as the digital pen moves across the display. This freezing effect acts like a flash-bulb in stop-motion photography applications and facilitates capturing encoded data received from the display accurately even if the pen is moved in a rapid manner across the display.

The position encoded contrast layer can be located in a front stack of the display and can be illuminated via a non-visible light source (near infra-red), such as from a digital pen, for example. Upon illumination with the non-visible light, the position encoded contrast layer returns encoded data back to the detector in the reflected pattern of light, which can be decoded to determine spatial position and/or motion of the detector. Since the position encoded contrast layer can be optically transparent to visible light (e.g., generated from the display), the position encoded optical elements and background area of the contrast layer do not to interfere (in the visible spectrum) with the generated display image being presented to the user. One or more linear polarizing layers (e.g., films) can be included with the display to enable linear polarization of reflected light to enable the position encoded contrast layer to polarize the non-visible reflected light and thereby encode a corresponding contrast pattern in the reflected light with respect to other parts of the display. In some examples, a holographic diffuser can be implemented to diffuse the transmitted light provided by the light source and thus enhance the receiving capabilities of the detector.

Figure 1:
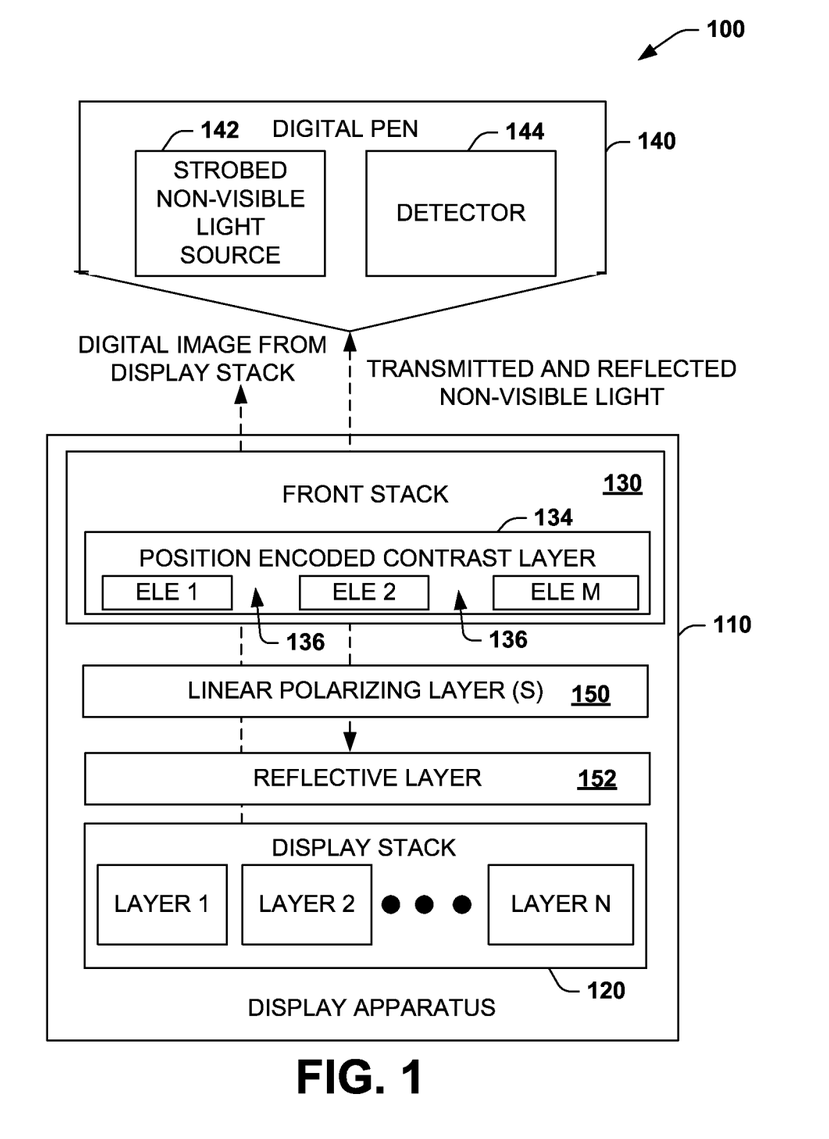
FIG. 1 illustrates an example of a display system having a strobed digital pen in accordance with the principles disclosed herein.

FIG. 1 illustrates an example of a system 100 that includes a display apparatus 110 and a light source, such as implemented in a digital pen 140 in accordance with the principles disclosed herein. The display apparatus 110 can include a display stack 120 having at least one layer shown as layers 1 though N to generate a digital display image, with N being a positive integer. The display stack 120 can generate a display image in a visible light spectrum that can be presented for viewing by one or more users. The display stack 120 can include multiple layers, such as including a liquid crystal display or a light emitting diode (LED) display, for example. Other example layers in the display stack 120 can include reflective films, backlighting layers, light diffuser films, color filter films, and optically clear adhesives (OCA's), for example, to bind the respective layers together in the display stack.

By way of example, the display apparatus 110 can include a front stack 130 that includes a position encoded contrast layer 134. The position encoded contrast layer can be disposed on a substrate, such as an optically transparent thin film. The position encoded contrast layer can include position encoded optical elements ELE 1, ELE 2, though ELE M, with M being a positive integer. The position encoded optical elements ELE 1, ELE 2, though ELE M can be polarized to a given polarization state (e.g., right hand circularly polarized). A background area shown at example locations 136 is polarized to a different polarization state from the position encoded optical elements (e.g., left hand circularly polarized). As used herein, the term background area refers to any portion of the position encoded contrast layer 134 that is not occupied in space by the position encoded optical elements ELE 1 though ELE M formed therein.

By way of further example, the position encoded contrast layer 134 can be implemented as (e.g., light controlled molecular orientation material—commercially available from Rolic Technologies of Switzerland). The optical elements ELE 1, ELE 2, though ELE M can be formed in the position encoded contrast layer 134 in response to polarized light through a corresponding mask.

The front stack 130 can include various layers such as a protective glass, a cover lens, and can include an input sensor such as a capacitive touch film sensor, for example. The position encoded contrast layer 134 has an optical characteristic (e.g., polarized encoded pattern of optical elements) that can polarize reflected, linearly polarized non-visible light that passes within the display in response to non-visible light provided by the digital pen 140. The non-visible light, can include infra-red (IR) light (e.g., about 700 to 1000 nanometer wavelength), such as generated from the digital pen 140. The digital pen 140 (illustrated with respect to FIGS. 3 and 4 below) includes a strobed non-visible light source 142. Although the strobed non-visible light source 142 is depicted in the digital pen 140 as shown in the example in FIG. 1, in other examples, the strobed non-visible light source 142 can reside in the display apparatus 110. The strobed non-visible light source 142 can benon-polarized light (e.g., randomly polarized); however, polarized light can be generated in some examples.

The strobed non-visible light source 142 can generate non-visible light that is strobed (e.g., turned on and off repeatedly) at a respective duty cycle and frequency. For example, the non-visible light transmitted from the digital pen 140 can be directed as incident light toward the display apparatus 110. The display apparatus can reflect at least a substantial portion of the incident non-visible light back to the digital pen 140. For example, the non-visible light from the digital pen 140 can be reflected by one or more layers of the display stack 120. Additionally or alternatively, the display apparatus 110 can include one or more reflective layers 152 to reflect the incident non-visible light back toward the digital pen 140. For example, the reflective layer(s) 152 can be implemented as diffuse reflective layer(s) optically transparent to visible light but diffusely reflective to the non-visible light from the digital pen 140. As disclosed herein, the digital pen 140 can determine an indication of location and/or movement of the digital pen 140 with respect to the display apparatus 110.

The digital pen 140 also includes a detector 144 for detecting patterns of light reflected from the display apparatus 110 such as in response to incident non-visible light transmitted by the light source 142. As will be described below with respect to FIGS. 2-4, the detector 144 can include an analyzer for discriminating between different polarization states in the reflected light pattern resulting from different polarization imposed by the position encoded optical elements ELE 1 though ELE M and the associated background area 136. The detector 144 can also include other filters, lens, and imaging sensors.

In one example, the position encoded optical elements ELE 1 though ELE M can be implemented as dots polarized in one direction (e.g., left circularly polarized) and the background area 136 of the contrast layer 134 can be polarized in the opposite direction (e.g., right circularly polarized.). The detector 144 in the digital pen 140 can be implemented as a digital camera or optical sensor (not shown). The detector 144 can receive and record the pen's movement by discriminating between light reflected from the position encoded optical elements ELE 1 though ELE M in contrast to the background area 136. In such examples, the position encoded optical elements may be patterned as an elliptically polarized pattern in one direction (e.g., ¼ wavelength retarded (circular), ⅙ wavelength retarded, ⅛ wavelength retarded) and the background area polarized with an elliptically polarized pattern in the opposite direction. A polarizer analyzer (not shown) in the digital pen 140 can then discriminate between the differently (e.g., oppositely) polarized position encoded optical elements and the background area. Output from the polarizer analyzer in the digital pen 140 can then be digitized via an image sensor in the pen to determine spatial location and movement of the pen.

One or more linear polarizing layers 150 (e.g., linear polarizing film) can linearly polarize non-visible light, including reflected light in response to the incident light from the source 142, and thereby enhance the contrast between the different polarization states imposed by the position encoded optical elements 134 and the background area 136. The linear polarizer layer 150 is optically transparent to visible light generated from the display stack. The diffuse reflective layer 152 (e.g., thin film reflective to near IR radiation and optically transparent to visible light) can thus reflect the strobed non-visible light pulses received from the digital pen 140 back through the linear polarizing layer(s) 150, though the position encoded contrast layer 134 and front stack back to the pen.

As shown in the example of FIG. 1, a display image is transmitted from the display stack 120 though the linear polarizing layer 150 and diffuse reflective layer 152, and is visible to the user at the output of the display apparatus 110. By linearly polarizing the strobed non-visible light pulses that are being reflected back to the pen, the linear polarizer layer 150 can enable a polarization contrast by the position encoded optical elements and the associated background area 136. By enabling the polarization contrast in the reflected light (e.g., from the position encoded optical elements and/or the background area), the digital pen 140 can receive and consequently decode a stronger signal having a higher signal to noise ratio (SNR) (e.g., greater contrast difference between position encoded optical elements and background area) causing higher SNR.

The position encoded contrast layer 134 can be positioned in the front stack 130, such as shown in FIG. 1. The linear polarizer layer 150 and diffuse reflective layer 152 can be positioned in the front stack 130, in the display stack 120 or be a separate layer between the front stack and the display stack, such as shown in FIG. 1. In response to being illuminated by a source, such as the digital pen 140, the position encoded contrast layer 134 returns encoded data back to the source where it can be decoded to determine spatial position and or movements of the digital pen 140 relative to the display apparatus 110, such as recording a digital signature, for example. The encoded data results from a reflected pattern of light received from the contrast layer 134, where the reflected pattern of light includes the different polarization states of the position encoded optical elements ELE 1 thought ELE M and background area 136 of the contrast layer 134.

Figure 2:
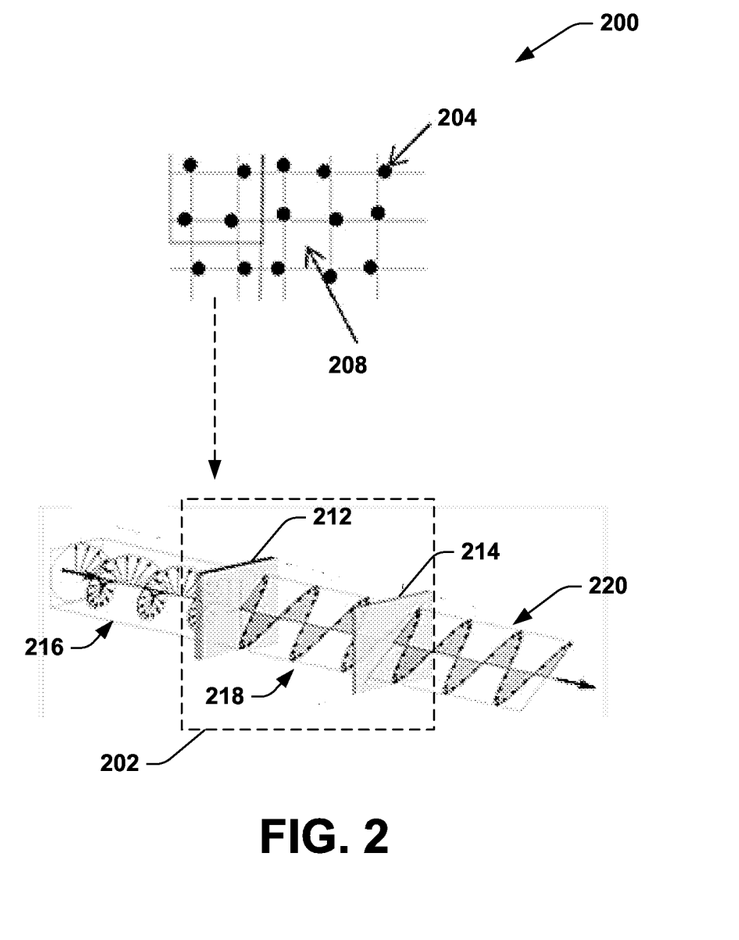
FIG. 2 illustrates an example of a circularly polarized pattern of position encoded optical elements and an analyzer to decode the position of the encoded pattern in accordance with the principles disclosed herein.

FIG. 2 illustrates an example of a circularly polarized position encoded pattern 200 of position encoded optical elements and an analyzer 202 to decode the position of the encoded pattern in accordance with the principles disclosed herein. In this example, the pattern 200 includes left hand circularly polarized position encoded optical elements 204 (also referred to as elements) that are patterned on a contrast layer such as described above with respect to FIG. 1 (e.g., thin film). Those areas of the contrast layer that are not patterned with position encoded optical elements 204 are referred to as a background area such as shown at 208. The background area 208 can be right hand circularly polarized, for example. As used herein, the term circularly polarized refers to one quarter wavelength retarding (or other retarding parameter such as ⅓, ⅕, ⅙, ⅐, ⅛ wave and so forth are included as forms of circularly polarized light which more generically is termed as elliptically polarized light) of light that is applied to the elements 204 and background area 208. The terms left and right refer to the direction of the retarding. In some examples, the elements 204 can be right hand circularly polarized and the background area 208 could be left hand circularly polarized. In either example, the respective elements 204 and background 208 area are polarized in opposite directions in order to provide contrast between the background and the respective elements. The pattern 200 can be provided on a film pattern retarder layer, for example, such as illustrated and described below with respect to FIGS. 3 and 4.

The analyzer 202 (also referred to as a circular polarizer analyzer) can include ¼ wavelength retarder layer 212 followed by a linear polarizer layer 214. As shown, circularly polarized light 216 received from the pattern 200 is converted to linear polarized light at 218 via the retarder layer 212. The linear polarized light 218 is either passed (seen/bright/dots) or blocked (not seen/dark/background) via linear polarizer 214 which can be subsequently analyzed via an image sensor and processor in a digital pen, for example, to determine location and movement of the pen via reflected light received from the circularly polarized pattern 200.

Figure 3:
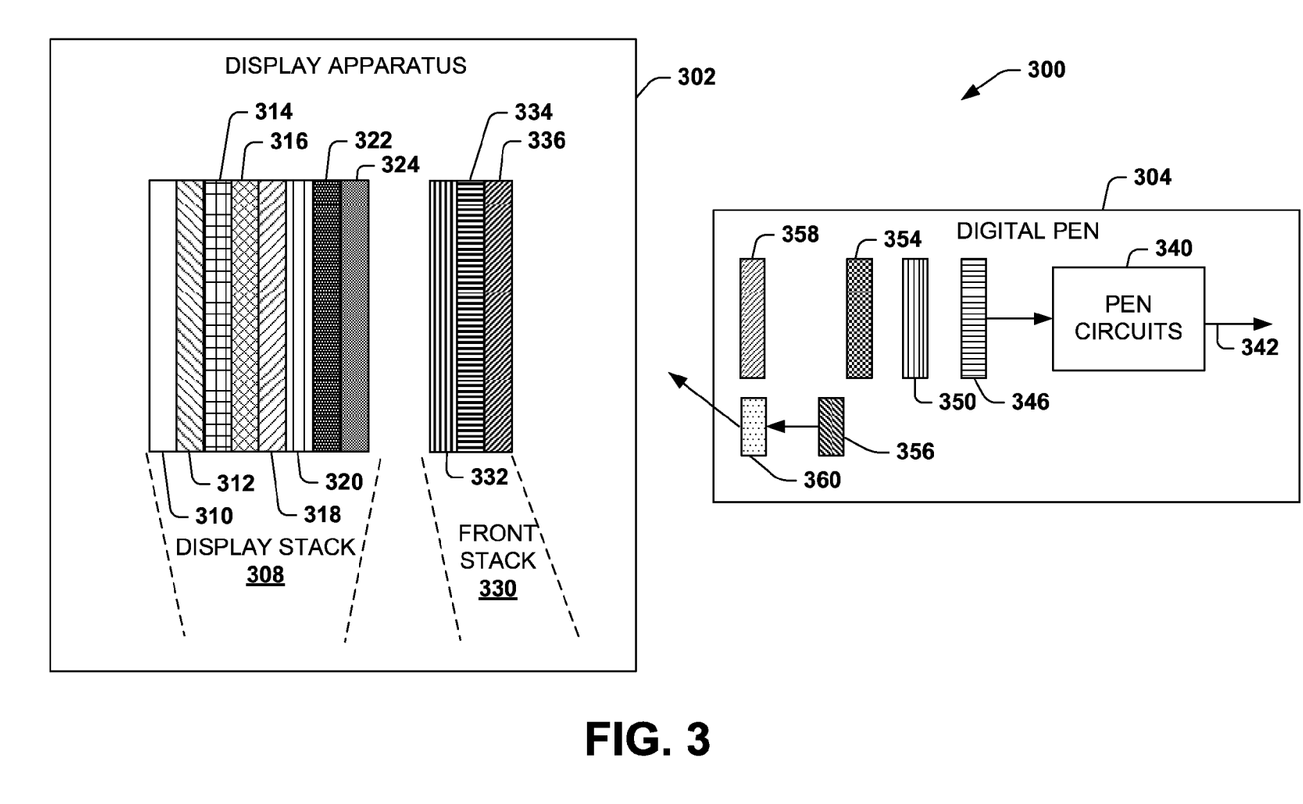
FIG. 3 illustrates an example of a display system that includes a linear polarizer film positioned within display stack of a display apparatus in accordance with the principles disclosed herein.

FIG. 3 illustrates an example system 300 that includes a display apparatus 302 and digital pen 304 in accordance with the principles disclosed herein. In the example of FIG. 3, a display stack 308 can include a reflective film layer 310 followed by a backlight layer 312 (e.g., planar LED lightpipe backlight). A light diffuser film layer 314 follows the backlight layer 312 and is followed by a linear polarizer film layer 316. A digital image generation module 318 is provided to generate digital images from the display stack 308. The digital image generation module 318 can be implemented as a liquid crystal module 318. In other examples, the digital image generation module 318 could alternatively be an LED module or a plasma display module, for example (in these cases not requiring the backlight layers). The liquid crystal module 318 can be followed by a color filter film 320 which in turn can be followed a second linear polarizer filter 322 to provide brightness control. A front glass (or plastic) layer 324 can be provided as the outmost layer for the display stack 308.

In the example of FIG. 3, the front stack 330 includes a position encoded layer 332 that can include a polarized encoded pattern (e.g., film pattern retarder ¼ wavelength retarded at 750 nanometers) which is described above with respect to FIG. 2. The front stack 330 can also include a touch sensor 334 to provide user input capability. The touch sensor 334 may not be present in other examples. The touch sensor 334 may be covered by a display cover lens 336 which can be made of plastic or glass, for example.

The digital pen 304 includes one or more pen circuits 340. The pen circuits 340 can include a processor circuit and software to enable decoding of the position encoded optical elements detected by the digital pen 304. The pen circuits 340 can include LED synchronization circuits (e.g., duty cycle and frequency to strobe IR LED), memories for decoding and digital packetization of the decoded pen data, and other software modules to operate the pen with respect to position encoded optical elements received from the display apparatus 302. Output from the pen circuits 340 can be sent via physical or wireless connection (e.g., Bluetooth) 342 to a computer (not shown) that operates the display apparatus 302, where pen movements detected by the digital pen 304 can be recorded and integrated with respective display applications.

Position encoded optical data received from the display apparatus 302 is digitized by an electronic imager 346 (e.g., CCD sensor, CMOS sensor, and so forth). An imaging lens 350 can precede the electronic imager 346. A long pass near-IR filter 354 can be provided. This filter 354 may or may not be included with a polarized encoded system as described herein. A pulsed (also referred to as strobed) LED 356 is provided to excite the position encoded optical elements and associated background area of the display apparatus 302. The LED can be a 750 nanometer wavelength for example and turned off and on at a given duty cycle and frequency.

The LED 356 can be strobed at the same rate (or at an integer or fractional multiple) as the rate at which the electronic imager 346 captures digital information, which can be at a rate from about 70 to about 120 hertz (Hz), for example. The frame duration or period of the imager 346 can be about 100 Hz. The LED strobe duration can be on the order of one to hundreds of microseconds during the respective imager frame period, for example. As mentioned, the strobing illumination can have the effect of freezing the image of the position encoded optical elements (e.g., dots) as the digital pen 304 moves across the display apparatus 302. As mentioned above, this freezing effect operates similar to a flash-bulb in stop-motion photography applications and facilitates capturing encoded data received from the display apparatus 302 accurately even if the pen is moved in a rapid manner across the display. A circular polarizer analyzer 358 can be included with a polarized encoded system which is described above with respect to FIG. 2. Another component that can be included in the digital pen 304 is a holographic diffuser 360. The holographic diffuser 360 has the effect of diffusing or scattering the light from the LED 356 which causes diffused light to be reflected back from the display apparatus 302 which facilitates receiving more reflected light from the display.

Figure 4:
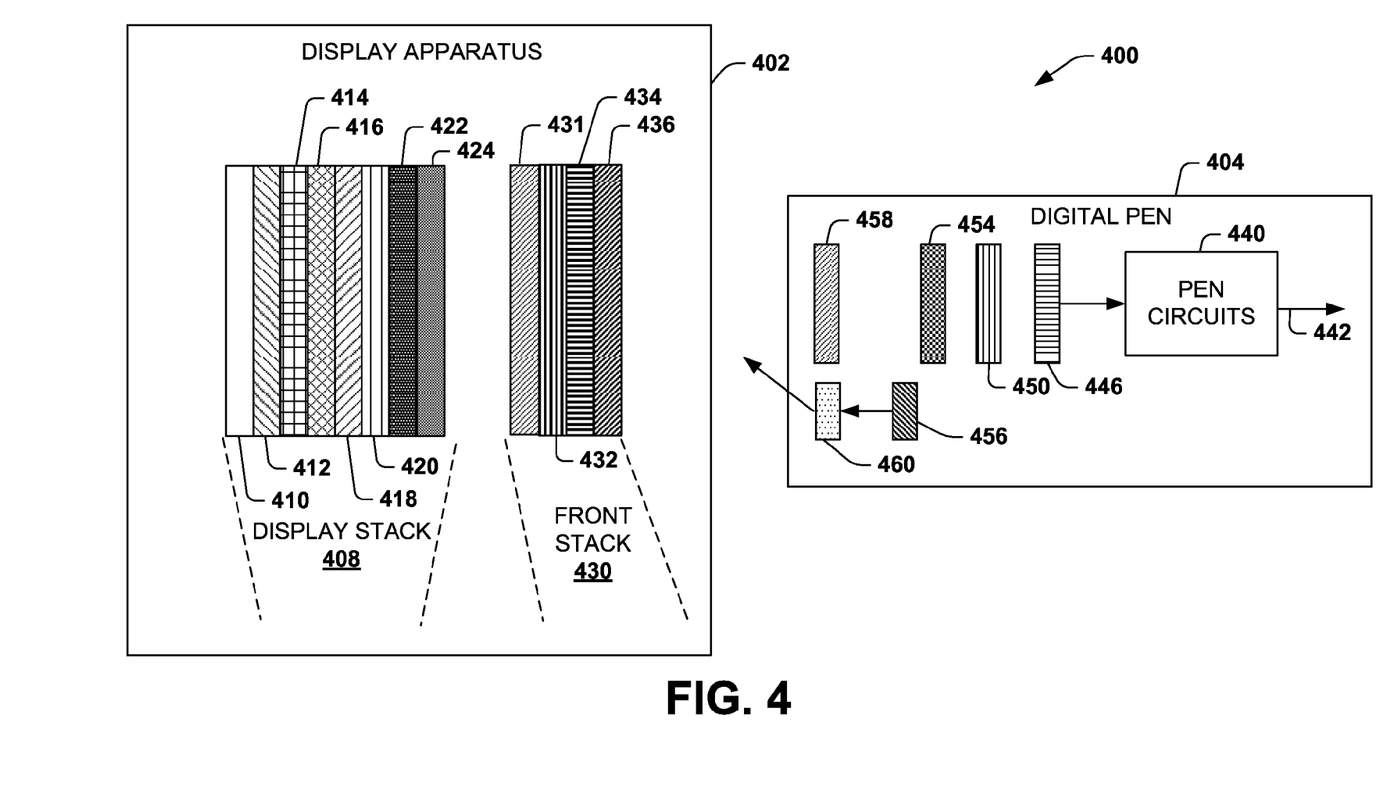
FIG. 4 illustrates an example display system that includes a linear polarizer film positioned within a front stack and display stack of a display apparatus in accordance with the principles disclosed herein.

FIG. 4 illustrates an alternative example system 400 that includes a display apparatus 402 and digital pen 404 in accordance with the principles disclosed herein. In the example of FIG. 4, a display stack 408 can include a reflective film layer 410 followed by a backlight layer 412 (e.g., planar LED lightpipe backlight). A light diffuser film layer 414 follows the backlight layer 412 and is followed by a linear polarizer film layer 416. A digital image generation module 418 is provided to generate digital images from the display stack 408. The digital image generation module 418 can be implemented as a liquid crystal module 418. In other examples, the digital image generation module 418 could alternatively be an LED module or a plasma display module, for example (some of the other stack elements will be either not required or replaced by functional equivalents as needed). The liquid crystal module 418 can be followed by a color filter film 420 which in turn can be followed a second linear polarizer filter 422 to provide brightness control. A front glass (or plastic) layer 424 can be provided as the outmost layer for the display stack 408.

In the example of FIG. 4, the front stack 430 includes an additional linear polarizer film layer 431 followed by a position encoded layer 432 that can include a polarized encoded pattern (e.g., film pattern retarder ¼ wavelength retarded at 750 nanometers) which is described above with respect to FIG. 2. The front stack 430 can also include a touch sensor 434 to provide user input capability. The touch sensor 434 may not be present in other examples. The touch sensor 434 may be covered by a display cover lens 436 which can be made of plastic or glass, for example.

The digital pen 404 includes one or more pen circuits 440. The pen circuits 440 can include a processor circuit and software to enable decoding of the position encoded optical elements detected by the digital pen 404. The pen circuits 440 can include LED synchronization circuits (e.g., duty cycle and frequency to strobe IR LED), memories for decoding and digital packetization of the decoded pen data, and other software modules to operate the pen with respect to position encoded optical elements received from the display apparatus 402. Output from the pen circuits 440 can be sent via physical or wireless connection (e.g., Bluetooth) 442 to a computer (not shown) that operates the display apparatus 402, where pen movements detected by the digital pen 404 can be recorded and integrated with respective display applications.

Position encoded optical data received from the display apparatus 402 is digitized by an electronic imager 446 (e.g., CCD sensor, CMOS sensor, and so forth). An imaging lens 450 can precede the electronic imager 446. A long pass near-IR filter 454 can be provided. This filter 454 may or may not be included with a polarized encoded system as described herein. A pulsed (also referred to as strobed) LED 456 is provided to excite the position encoded optical elements of the display apparatus 402. The LED can be a 750 nanometer wavelength for example and turned off and on at a given duty cycle and frequency.

The LED 456 can be strobed at the same rate as the electronic imager 446 captures digital information which can be at a rate from about 70 to about 120 hertz (Hz), for example. The frame duration or period of the imager 446 can be about 100 Hz. The LED strobe duration can be on the order of one to hundreds of microseconds during the respective imager frame period, for example. This has the effect of freezing the image of the position encoded optical elements (e.g., dots) as the digital pen 404 moves across the display apparatus 402. This freezing effect acts like a flash-bulb in stop-motion photography applications and facilitates capturing encoded data received from the display apparatus 402 accurately even if the pen is moved in a rapid manner across the display. A circular polarizer analyzer 458 can be included with a polarized encoded system which is described above with respect to FIG. 2. Another component that can be included in the digital pen 404 is a holographic diffuser 460. The holographic diffuser 460 has the effect of diffusing or scattering the light from the LED 456 which causes diffused light to be reflected back from the display apparatus 402 which facilitates receiving more reflected light from the display.

Figure 5:
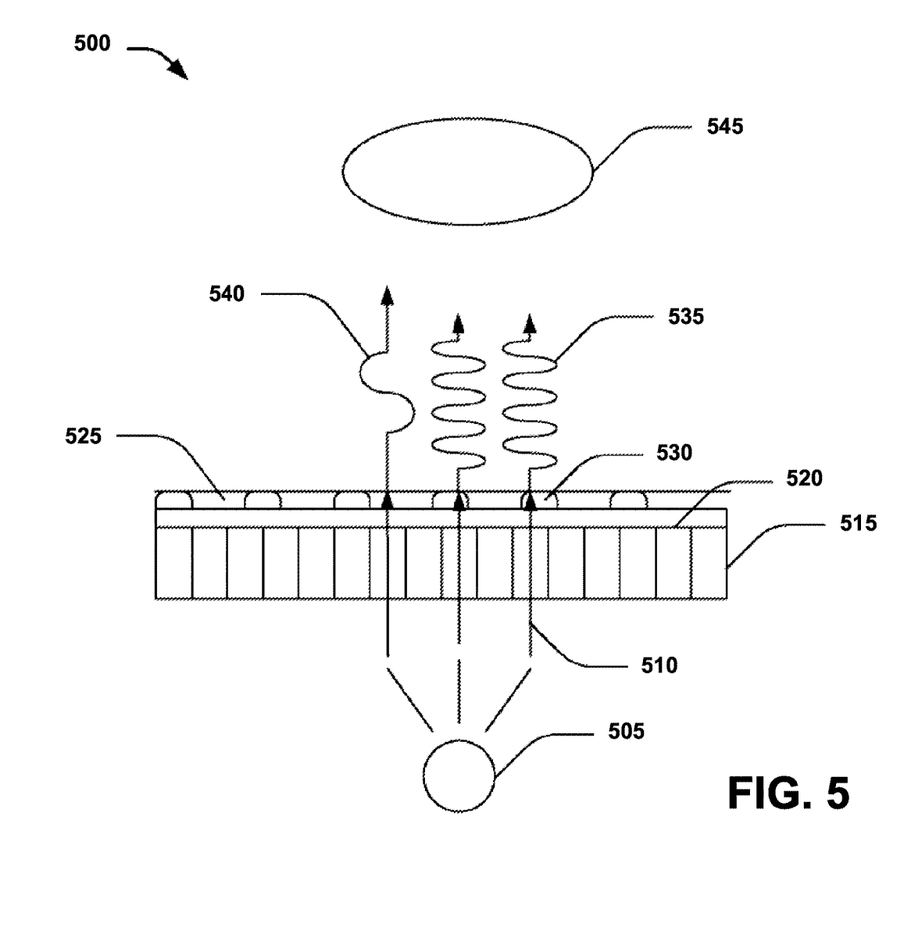
FIG. 5 illustrates an example positional input system for detecting position encoded optical elements in accordance with the principles disclosed herein.

FIG. 5 illustrates an example positional input system 500 where position encoded optical elements can be detected in accordance with the principles disclosed herein. The system 500 can include a strobed light source 505 (e.g., polarized or non-polarized) providing light having a polarization state 510 and strobed at a given frequency and duty cycle. The light source 505 can be within or proximate to a display device including a display 515 having a surface 520. A substrate (e.g., background layer) 525 having a predetermined pattern of visibly transparent polarization altering optical elements 530 can be disposed proximate the surface 520 to change or otherwise alter the polarization state 510 of at least a portion of the incident light produced by the light source 505 to provide light having a changed polarization state 535. The polarization state of light passing through the substrate 525 but not passing through a polarizing element 530 can be changed to a polarization state 540 that differs in one or more characteristics from the incident light having polarization state 510 (e.g., light from the source 505) and light having changed polarization state 535 (e.g., light exiting or being reflected from one of the polarizing elements 530).

The differing changed polarization states 535, 540 of the light exiting the display 515 enables the "reading" of the pattern of polarizing position encoded optical elements 530 using a detector 545 capable of distinguishing the changed polarization states 535, 540. Reading the pattern of polarizing elements is possible based upon the detectors ability to discern the changed polarization state 535 of light exiting the polarizing elements 530 from the background changed polarization state 540 of light exiting the substrate 525. This is typically enabled via the use of a circular polarizer analyzer in front of the imager. For the differing changed polarization states 535, 540 being left and right hand circular polarized states the circular polarizer analyzer is constructed via the stacking of a ¼ wave retarder film in front of a linear polarizing film, for example. Based upon the unique encoded absolute positional information between the visibly transparent polarizing elements 530, the detector can determine its location on the surface 520 of the display 515. The pattern and density of the visibly transparent polarizing elements 530 contributes to the accuracy of the detector 545 in determining its location with respect to the display 515. A higher density pattern of visibly transparent polarizing elements 530 disposed across the surface 520 of the display 515 generally improves the accuracy of the location determination by the detector 545. Based upon the unique encoded absolute positional information encoded in the location the visibly transparent polarizing elements 530 relative to each other, a precise determination of detector (pen) 545 location with respect to the display is possible.

The polarization state 510 may be one of a plurality of polarization states. However, in some examples, the light can be provided using a strobed light source 505 generating light having a specific polarization state. In yet other examples, the light may be provided using a non-specific polarized light source 505 generating light having a random polarized state. The light produced using a non-specific polarized light source 505 can be filtered or similarly adjusted to provide light having only the polarization state 510. The light source 505 can include any number of individual polarized light sources.

The display 515 can have a surface 520 from which light having the polarization state 510 exits or is otherwise emitted. The display 515 may incorporate any technology, for example liquid crystal display (LCD) technology; light emitting diode (LED); organic LED (OLED); active matrix OLED (AMOLED); or any other display technology. Although not depicted as such in FIG. 5, the light source 505 may be incorporated into the display 515. For example, the independent LEDs forming an LED display 515 may each be considered a light source 505. Alternately, LCD displays emit linear polarized light via their inherent design. A substrate 525 having predetermined pattern of visibly transparent polarizing elements 530 disposed therein can be disposed proximate the 520 to change or otherwise alter the polarization state 510 to provide light having a changed polarization states 535 (for light passing through the polarizing element 530) and 540 (for light passing through the substrate 525).

The predetermined pattern of visibly transparent polarizing elements 530 may be applied directly to the surface 520 of the display 515. However, in other examples, the predetermined pattern of visibly transparent polarizing elements 530 may be applied to the substrate (e.g., carrier) 525, for example a material that does not affect the polarization state of light transiting the substrate or carrier, that can in turn be applied to the surface 520 of the display 515 via a bonding agent. The polarization state of light passing through each the transparent polarizing elements 530 disposed on the surface 520 of the display 515 can be altered or otherwise changed based upon polarizing element 530 physical characteristics, composition, or any combination thereof.

Each of the transparent polarizing elements 530 can be composed of a material, for example a polymeric material, capable of transforming or otherwise altering the polarization state of light passing through the polarizing element. For example, linear vertically polarized light generated by a source and passing through a polarizing element 530 may be phase retarded ¼ wave in one direction, for example left or right, while the linear polarized light passing through the substrate 525 may be phase retarded ¼ wave in the opposite direction. Other changes in polarization state of the light passing through the substrate 525, the polarizing elements 530, or both may be used. Similarly, any polarized light source 505 may be used such that the changed polarization state 535 of the light passing through the polarizing elements 530 is distinguishable from the changed polarization state 540 of the light passing through the substrate 525.

An example polymeric material capable of providing the transparent polarizing elements 530 can include, but is not limited to, a photo-aligned, anisotropic optical thin film such as that produced by Rolic® Research Ltd., although other materials and other manufacturers capable of providing similar polarization based filtering capabilities may be substituted. Rolic® provides a curable, liquid, light controlled molecular orientation ("LCMO") polymeric material suitable for photo lithographically producing the polarizing elements 530 within the substrate 525. Through the use of LCMO materials it is possible to create structured optical elements on a microscopic or macroscopic scale using light-induced spatial alignment of molecules within the LCMO material. The LCMO aligns molecules, for example, the molecules forming the polarizing elements 530, in a predefined manner in photo alignment layers by irradiating them with ultraviolet polarized light. Based upon the choice of materials and the direction of incidence and polarization of the light used to form the polarizing elements 530, it is possible for the molecules forming the polarizing elements 530 to be aligned in any direction of the three-dimensional space. An index of refraction birefringence maybe introduced in the material hence producing these polarization altering phase retarding elements.

When disposed upon or formed within a suitable substrate 525, the visibly transparent polarizing elements 530 are not visible to the naked eye when back-illuminated (for example, when back illuminated by the strobed polarized light source 505). The visibly transparent polarizing elements 525 can be deposited on or otherwise formed within the substrate using any method or system, including but not limited to, photolithography and conventional printing technologies.

The polarizing elements 530 can be disposed within the substrate 525 in a unique, specific, spatial or positional pattern. The use of such a pattern creates a geometric relationship between the polarizing elements 530 relative to each other and by extension their location on the display 515. The geometric relationship between the polarizing elements 530 and the display 515 permit the ability to determine the location of the detector 545 sensitive to the changed polarization state 530 of the light emitted by the polarizing elements 530 when the detector 545 is disposed proximate the display 515. The pattern of light having the changed polarization state 530 sensed by the detector 545 permits the precise determination of the physical location of the detector 545 on the display 515. Increasing the number or density of the polarizing elements 530 (for example by forming greater numbers of physically smaller, closer grouped polarizing elements 530) and their location accuracy relative to each other enhances the location detection capability of the detector 545. The size of each of the polarizing elements can vary based on factors such as desired resolution, mastering technique, and the overall size of the display 515; however, in some examples the size of each of the polarizing elements 530 can be on the order of 100 microns and can be as small 5 to 10 microns diameter.

Since changes in the polarization state of light are imperceptible to the human eye, the light emitted by the display 515 will appear uniform across the display regardless of the changed polarization state 535, 540 of the light. The ability to provide a visually transparent substrate 525 containing visually transparent polarizing optical elements 530 enables the use of a detector 545 sensitive to the changed polarization state 535 of the light passing through the polarizing elements 530 to determine the physical location or position of the detector 545 on the display 515 while at the same time providing minimal impairment of the user's view of the display 515. The detector 545 can be implemented in a digital pen or other structure such as disclosed herein (see, e.g., FIGS. 1, 3 and 4). The ability to provide location-based data to the detector 545 while concurrently providing a minimally impaired view of the display 515 to the user provides the display with the ability to contemporaneously function as both an input device (e.g., a device capable of detecting location based input via the detector 545) and an output device (e.g., a display capable of displaying data). An example of the utility of such a device can be found in a display based input tablet—such a tablet would enable easy, customizable, user configuration of various tiles and input designators on the tablet surface.

The detector 545 can include any device, system, or combination of systems and devices suitable for detecting the changed polarization state 535 of the light exiting the polarizing element 530. For example, a detector 545 sensitive to the changed polarization state 535 of the light exiting the polarizing elements 530 can incorporate a circular polarizer analyzer in front of the detector (imager). For the differing changed polarization states 535, 540 being left and right hand circular polarized states, the circular polarizer analyzer can be constructed via the stacking of a ¼ wave retarder film in front of a linear polarizing film. This allows for transmission of one of the polarization states and blockage of the other whereby generating a high contract image irrespective of the orientation of the detector (pen). Other polarization sensitive technologies with similar performance can be used as the basis for the detector 545.

Where the detector 545 will be used as an input device to a tablet or where the detector 545 will be used similar to a drafting pen, physical displacement of the detector 545 across the surface 520 of the display 515 affects the scan rate, exposure, and blur reduction capabilities of the detector 545 to properly discern the pattern of polarizing dots 530. Additional logic can therefore be incorporated into the detector 545 to increase or decrease the detector scan rate based at least in part upon the velocity with which the detector is moved across the surface 520 of the display 515. Similarly, the logic providing for exposure compensation and blur reduction can also be incorporated into the detector 545 based at least in part upon the velocity with which the detector is moved across the surface 520 of the display 515.

Figure 6:
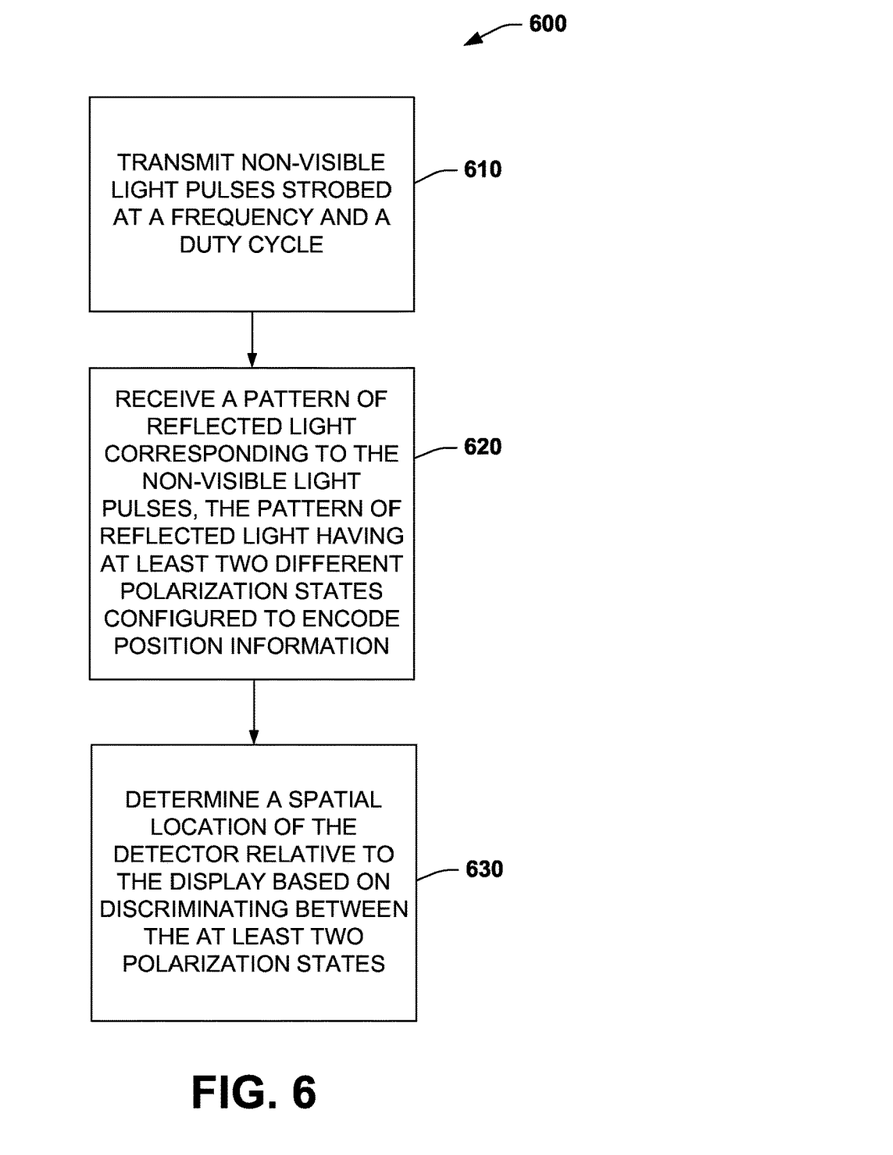
FIG. 6 illustrates an example of a method to detect position encoded optical information from a display in accordance with the principles disclosed herein.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components such as executed by an integrated circuit, computer, or a controller, for example.

FIG. 6 illustrates an example of a method 600 to facilitate detection of position encoded optical information from a display in accordance with the principles disclosed herein. At 610, the method 600 transmitting non-visible light pulses strobed at a frequency and a duty cycle (e.g., via light source 142 of FIG. 1). At 620, the method 600 receiving at a detector a pattern of reflected light corresponding to the non-visible light pulses, the pattern of reflected light having at least two different polarization states to encode position information (e.g., via detector 144 of FIG. 1 or detector 545 of FIG. 5). At 630, the method 600 includes determining a spatial location of the detector relative to the display based on discriminating between the at least two polarization states (.e.g., via detector 144 of FIG. 1). The method 600 can also include receiving the pattern of light from position encoded optical elements and a background area of a contrast layer arranged in a front stack associated with the display. The position encoded optical elements polarized to one polarization state and the background area polarized to another polarization state to provide the pattern of reflected light from the display.

Figure 7:
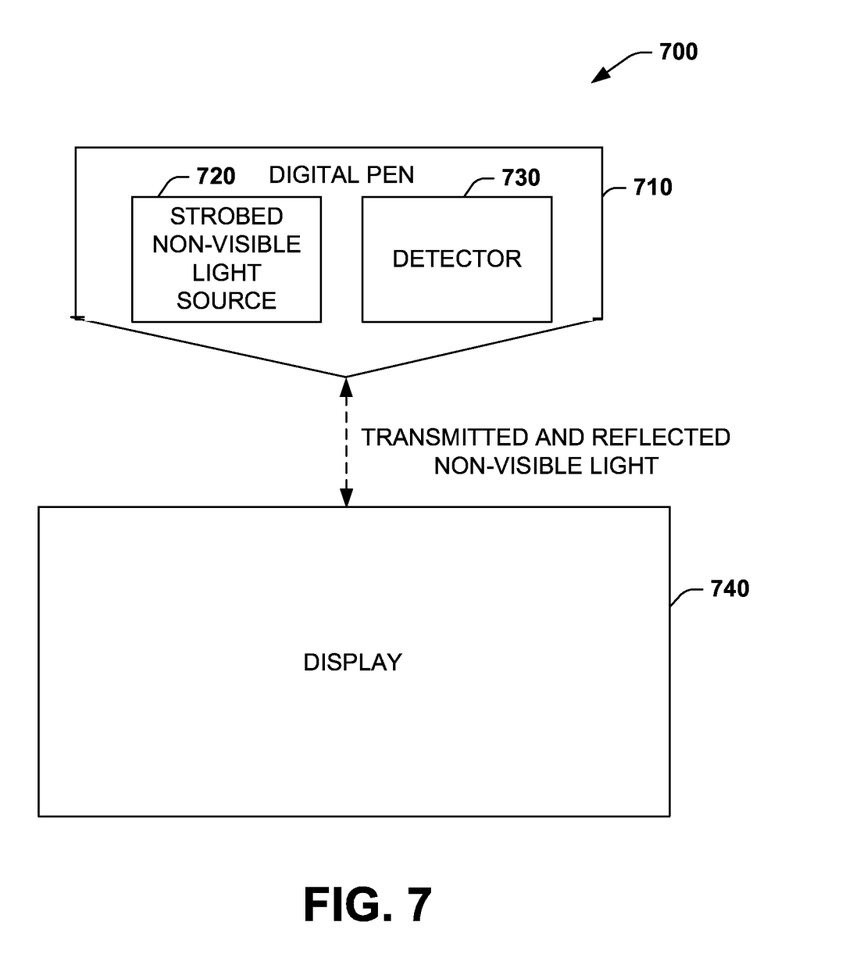
FIG. 7 illustrates an alternative example of a display system having a strobed digital pen in accordance with the principles disclosed herein.

FIG. 7 illustrates an alternative example of a display system 700 having a strobed digital pen 710 in accordance with the principles disclosed herein. The digital pen 710 includes a light source 720 to transmit non-visible light pulses strobed at a frequency and a duty cycle. The digital pen 710 includes a detector 730 to receive a pattern of reflected light from a display 740 in response to the non-visible light pulses. The pattern of reflected light from the display can have at least two different polarization states. The detector 730 can determine a spatial location of the detector relative to the display 740 based on discriminating between the at least two polarization states. As illustrated and described above with respect to FIG. 1, the pattern of light can be received from a position encoded contrast layer (See e.g., FIG. 1) associated with the display 740. The position encoded contrast layer can include position encoded optical elements polarized to one of the at least two polarization states and a background area polarized to another of the at least two polarization states to polarize reflected light from the display to provide the pattern of reflected light having the at least two polarization states.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
    a light source to transmit non-visible light pulses strobed at a frequency and a duty cycle; and
    a detector to receive a pattern of reflected light from a display in response to the non-visible light pulses, the pattern of reflected light having at least two different polarization states, the detector to determine a spatial location of the detector relative to the display based on discriminating between the at least two polarization states,
    wherein the pattern of reflected light is received from a position encoded contrast layer associated with the display, the position encoded contrast layer includes position encoded optical elements polarized to one of the at least two polarization states and a background area polarized to another of the at least two polarization states.

2. The apparatus of claim 1, wherein the detector further comprises a circular polarizer analyzer to discriminate between reflected light received from the position encoded optical elements and the background area received in the pattern of light.

3. The apparatus of claim 2, wherein the circular polarizer analyzer includes a ¼ wavelength circular polarizer layer followed by a linear polarizer layer to discriminate between the at least two polarization states in the pattern of reflected light from the display.

4. The apparatus of claim 2, wherein the detector further comprises a long-pass near infra-red (IR) filter to filter the received pattern of light.

5. The apparatus of claim 1, further comprising a holographic diffuser to diffuse the non-visible light pulses generated from the light source.

6. A system, comprising:
    a display comprising at least one layer to generate a digital display image and a position encoded contrast layer;
    a light source to transmit non-visible light pulses strobed at a frequency and a duty cycle; and
    a detector to receive a pattern of reflected light from the display in response to the non-visible light pulses, the pattern of reflected light having at least two different polarization states, the detector to determine a spatial location of the detector relative to the display based on discriminating between the at least two polarization states, wherein the position encoded contrast layer comprises position encoded optical elements polarized to one polarization state and a background area polarized to another polarization state to polarize non-visible light reflected within the display.

7. The system of claim 6, wherein the detector further comprises a circular polarizer analyzer to discriminate between the at least two polarization states in pattern of the reflected light received from the display.

8. The system of claim 7, further comprising a holographic diffuser to diffuse the non-visible light pulses generated from the light source.

9. The system of claim 6, wherein the display includes a display stack and a front stack to generate the digital display image, wherein the display stack includes at least one linear polarizer layer to linearly polarize the non-visible light reflected within the display to enable the position encoded optical elements and the background area to polarize the linearly polarized non-visible light to the at least two different polarization states.

10. The system of claim 9, wherein the front stack includes a linear polarizer layer to enhance the contrast between the position encoded optical elements and the background area.

11. The system of claim 9, wherein the display further comprises a reflective layer to reflect the non-visible light pulses generated from the light source, the reflective layer located between the linear polarizer and at least a portion of the display stack.

12. A method, comprising:

transmitting non-visible light pulses strobed at a frequency and a duty cycle;

receiving at a detector a pattern of reflected light corresponding to the non-visible light pulses, the pattern of reflected light having at least two different polarization states to encode position information;

determining a spatial location of the detector relative to a display based on discriminating between the at least two polarization states; and receiving the pattern of light from position encoded optical elements and a background area of a contrast layer arranged in a front stack associated with the display, the position encoded optical elements polarized to one polarization state and the background area polarized to another polarization state to polarize non-visible light reflected within the display and to provide the pattern of reflected light from the display having the at least two polarization states.

* * * * *

UNITED STATES PATENT AND TRADEMARK OFFICE
CERTIFICATE OF CORRECTION

Page 1 of 1

PATENT NO. : 10,088,917 B2
APPLICATION NO. : 15/500267
DATED : October 2, 2018
INVENTOR(S) : Fred Thomas It is certified that error appears in the above-identified patent and that said Letters Patent is hereby corrected as shown below:

On the Title Page

In item (57), ABSTRACT, in Column 2, Line 3, before "receives" delete "a detector".

Signed and Sealed this
Ninth Day of April, 2019

Andrei Iancu
*Director of the United States Patent and Trademark Office*